UNITED STATES PATENT OFFICE.

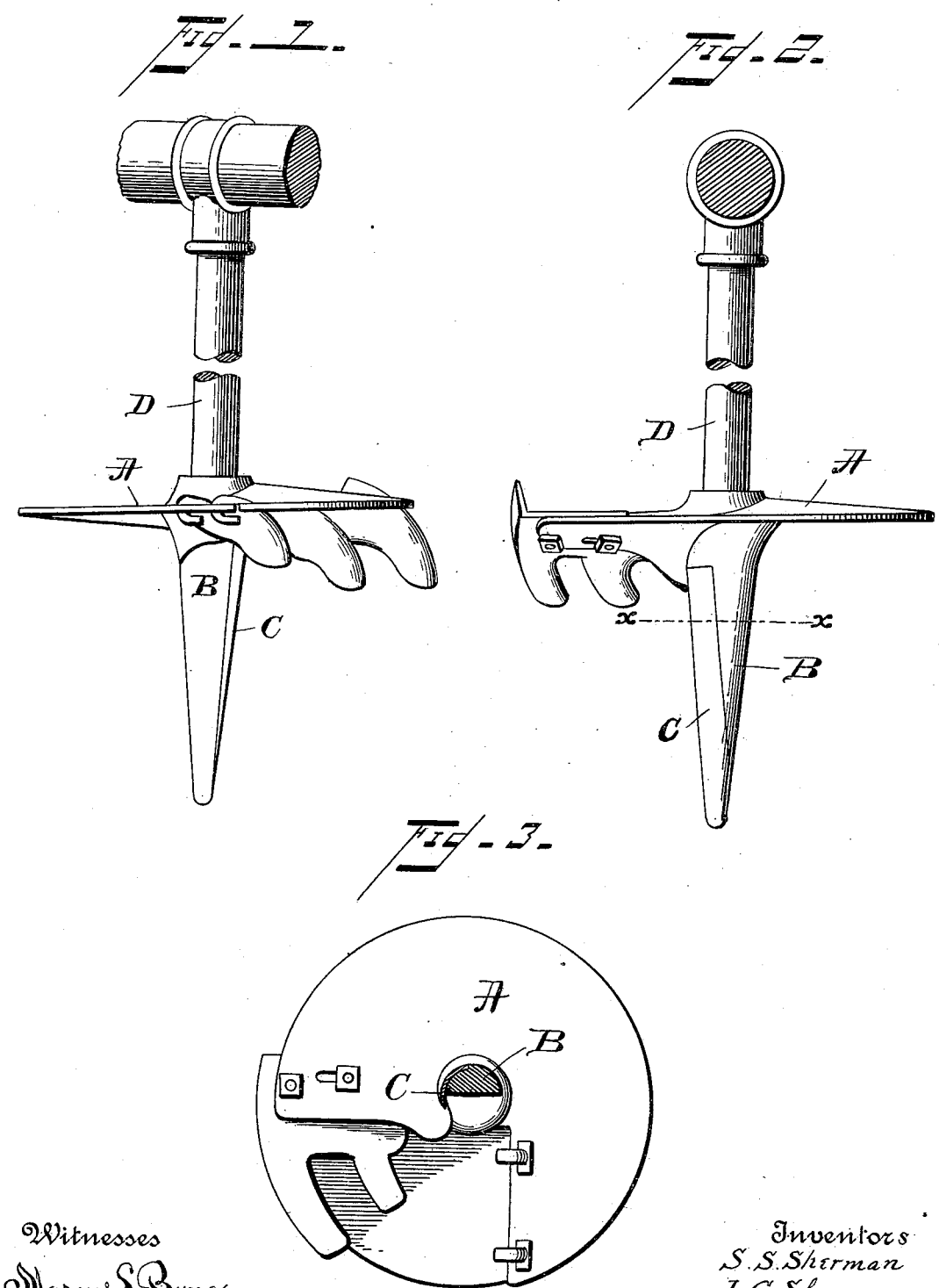

JEREMIAH G. SHERMAN AND SAMUEL S. SHERMAN, OF WEST McHENRY, ILLINOIS.

EARTH-AUGER.

SPECIFICATION forming part of Letters Patent No. 648,155, dated April 24, 1900.

Application filed February 18, 1899. Serial No. 706,028. (No model.)

*To all whom it may concern:*

Be it known that we, JEREMIAH G. SHERMAN and SAMUEL S. SHERMAN, citizens of the United States, and residents of West McHenry, in the county of McHenry and State of Illinois, have invented certain new and useful Improvements in Earth-Augers; and we do declare the following to be a full, clear, and exact description of the invention, such as will enable others skilled in the art to which it appertains to make and use the same, reference being had to the accompanying drawings, and to letters of reference marked thereon, which form a part of this specification.

Figures 1 and 2 of the drawings are side elevations of the invention in different positions, shank D being broken away. Fig. 3 is a section on line 4 4, Fig. 2, looking upwardly.

This invention is designed as an improvement upon the earth-auger described and claimed in our Patent No. 295,444, dated March 18, 1884, and has for its object to provide the auger with an improved point below its cutting-bit adapted to steady and center the auger and enable it to cut a hole larger than the diameter of its blade. Considerable difficulty has been experienced heretofore in providing augers of this class with a point sufficiently large to steady and center the auger in soft ground which would force its way easily through dry hard ground. This difficulty we propose to overcome by our invention, which consists in a point of the peculiar construction and arrangement hereinafter described, and pointed out in the appended claim.

Referring to the accompanying drawings, the letter A designates an auger of the kind described in our said patent, having the shank provided with a spiral flange or auger-blade and the cutter at the lower extremity of said flange, and B designates our improved point, which is cast or otherwise secured to the under side of the auger-blade. This point is of the form of a semicone, slightly rounded at the point. Secured to the convex side of the said point is a steel cutter-blade C, whose concave cutting portion extends partially over the flat face of the point from the side thereof nearest the inner extremity of the bit of the auger-blade, the outer surface of said cutter forming a continuation of the conical surface of the point. We have usually made this point about four and one-half inches long; but it may be made of any suitable length. The cutter C, which projects from the edge of the flat side of the point adjacent to the bit, is set to cut in the same direction as the bit and follows behind the bit. This cutter is of gradually-increasing width from bottom to top. (See Fig. 1.) The point, together with the stem or shank D, is eccentric with respect to the auger-blade, so that the latter will cut a hole of a diameter somewhat in excess of its own diameter.

The semiconical point acts to hold the auger in place in soft ground, owing to its flat side being placed against the pressure of the earth in cutting therethrough, and cuts its way through hard ground, where it would be impossible to force a round or conical point of sufficient size to hold the auger in place in soft ground.

Although especially designed for use in connection with the auger shown, a similar point may be used to advantage upon other augers.

Having thus described our invention, what we claim as new, and desire to secure by Letters Patent, is—

The combination with an earth-auger, having the spiral flange and bit upon the shank thereof, of a centering and steadying point of the form of an elongated semicone, the flat side of which faces the cutting pressure of said bit, and a cutting-flange of gradually-increasing width from bottom to top projecting from the edge of said flat side nearest the inner extremity of said bit, the outer surface of said cutting-flange forming a continuation of the conical surface of the point, substantially as specified.

In testimony whereof we affix our signatures in presence of two witnesses.

JEREMIAH G. SHERMAN.
SAMUEL S. SHERMAN.

Witnesses:
JOHN W. KIMBALL,
H. C. MEAD.